US006978366B1

(12) United States Patent
Ignatchenko et al.

(10) Patent No.: US 6,978,366 B1
(45) Date of Patent: Dec. 20, 2005

(54) SECURE DOCUMENT MANAGEMENT SYSTEM

(75) Inventors: Sergey Ignatchenko, Toronto (CA); Lev Mirlas, Thornhill (CA); Igor L. Tantsorov, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 09/690,249

(22) Filed: Oct. 17, 2000

(30) Foreign Application Priority Data

Nov. 1, 1999 (CA) .................................... 2287871

(51) Int. Cl.[7] .............................................. H04L 9/14
(52) U.S. Cl. ...................... 713/166; 713/165; 713/167; 713/193
(58) Field of Search ............................. 713/166, 165, 713/167, 193; 711/163

(56) References Cited

U.S. PATENT DOCUMENTS 5,052,040 A * 9/1991 Preston et al. ............... 713/165
5,825,877 A * 10/1998 Dan et al. ..................... 705/54
6,272,593 B1 * 8/2001 Dujari ......................... 711/118

* cited by examiner

Primary Examiner—Gilberto Barron, Jr.
Assistant Examiner—Daniel M. Ungar
(74) Attorney, Agent, or Firm—Louis P. Herzberg

(57) ABSTRACT

The invention provides a method and apparatus for secure management of data in a computer controlled storage system. The system includes a trusted data management server (tdm server), responsive to a user or user program application, for storing data in and retrieving data from a storage system. The tdm server includes a security structure generator to generate the following security management structures: an unique identifier for the data; access control information for the data; a data signature for authenticating the data from the data and the unique identifier; and an access control information signature for authenticating the access control information from the access control information and the unique identifier.

20 Claims, 6 Drawing Sheets

DOCUMENT UPDATE FLOWCHART

FIG. 6b
DOCUMENT RETRIEVAL FLOWCHART
DETAIL OF RESPONSE

FIG. 7
ACL UPDATE FLOWCHART

*FIG. 8*
ACL CHECK FLOWCHART

SECURE DOCUMENT MANAGEMENT SYSTEM

FIELD OF THE INVENTION

The invention relates to a secure document management system for storing, retrieving and updating data or documents stored in a database system where access to the data is restricted from the database administrator.

BACKGROUND OF THE INVENTION

Database management systems are very efficient at storing large amounts of data; however, the data on these systems can be open to compromise or corruption by the database storage administrator or others gaining access to the system, either by accident or otherwise.

In this discussion of the background of the invention, and in the description of the invention that follows in later sections of this description reference will be made to a number of drawings of which the following is:

It has been desirable to develop a system for management of application access control information where the access to a data element in storage in the database system cannot be compromised by the actions of the database storage administrator, and where no persistent storage is required on the application server in order to maintain trust in integrity of the data, and in enforcement of access control to the data.

Figure 1:
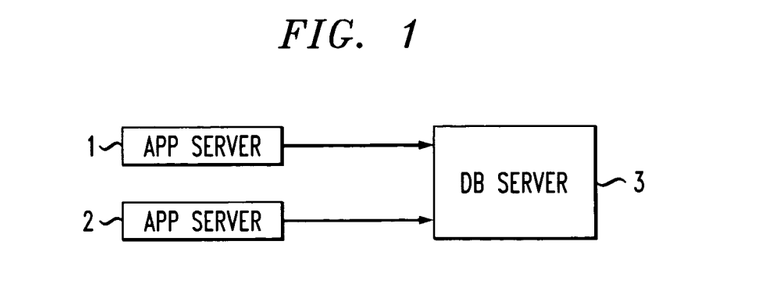
FIG. 1 depicts a simple data processing system using two application servers and a database server accessed by them.

A common implementation of a computing service relies on the availability of two entities: an Application Server, which is responsible for executing application logic of an application being used; and a Database Server, which is responsible for persistent storage of data. FIG. 1 illustrates one version of such a system with two application servers 1, 2, and a database server 3.

Figure 2:
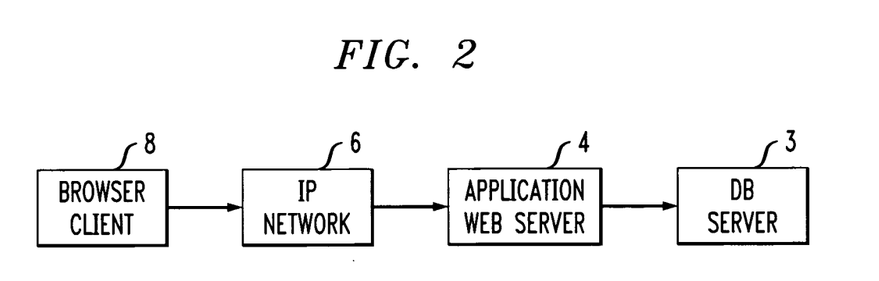
FIG. 2 depicts a network data processing environment in which access to a database server is gained through a network.

FIG. 2 illustrates a slightly more complex data processing environment such as found in network computing using a 3 tier architecture using a browser client 8, which may be employed by a user to gain access to store, update or retrieve data, through an Information Processing network 6, to application web server 4 to access database server 3 which can access the data.

Frequently one of the responsibilities of the application server is to enforce access control to the data or the services that it manages. This is commonly accomplished by the use of Access Control Lists (ACLs). An access control list (ACL) is associated with the secure item (the protected data), and contains the list of authorized entities (e.g. people, organizations, or applications), as well as each entity's permission for access to the item. It is very convenient to store the access control list on the database server, so that application data, as well as the corresponding access control information are managed by the same database store.

One of the aspects of this invention addresses the area of trust between an application server and a database server to which it has access. In prior art known systems the end users of a data processing system trust both the application server and the database server to have access to their data.

However, where multiple applications may access a database server, a user may only trust the application that the user is accessing rather than any other application that uses the same database server. In these situations it is important to ensure that the following objectives are met:

1. The database server administrator cannot understand the information that it stores;

2. The database server administrator cannot modify the information that it stores; and, 3. The database server administrator cannot modify the access permissions to the information that it stores.

The present invention describes a system to satisfy the above requirements so that even a multi-tier system can use a database server for persistent data management, without requiring the database store to be trusted with the contents of the data nor access to the data.

SUMMARY OF THE INVENTION

One aspect of the invention provides apparatus for secure management of data in a computer controlled storage system including: a trusted data management server (tdm server), responsive to a user or user program application, for storing data in and retrieving data from a storage system including: a security structure generator to generate the following security management structures: an unique identifier for the data; access control information for the data; a data signature for authenticating the data from the data and the unique identifier; and an access control information signature for authenticating the access control information from the access control information and the unique identifier.

Preferably the apparatus would include an encryption device or program for encrypting the data before storing it, and, if required by the tdm server for added security, the access control information, as well.

The tdm server can control access for the data stored in the storage with the unique identifier.

The access control of the tdm server is responsive to a request from a user for accessing secured data from the storage system, and to:

retrieve a unique identifier for the secured data from the user or storage system;

retrieve from the storage system the security management structures corresponding to the secured data; and carry out the following determination steps:
- determine if the access control information and unique identifier correspond with the access control information signature;
- determine if the secured data and its unique identifier correspond with the data signature;
- determine if the unique identifier of the access control information corresponds with the unique identifier of the secured data; and
- determine whether the access control information permits the user to access the secured data; and then grant access to the user to the data if each of the determination steps is satisfied, and otherwise refuse access.

The access control may further notify the user if access is refused.

Another aspect of the system of the invention for secure management of data in a computer controlled storage system includes:
- a trusted data management server (tdm server) accessible to a user or user program application;
- storage managed by a storage server;
- a communication system for connecting the trusted data management server and the storage server for the transfer of information therebetween; the tdm server being adapted to manage protected data in the storage means with unique identifiers, data signatures, access control information, and access control information signatures;
- the storage server being adapted to store protected data, signatures of the data, unique identifiers, access information, access information signatures, to permit access of the protected data under management of the tdm server.

Another aspect of the invention provides a system for the secure management of documents in a database system including:
- a trusted document management server (tdm server) accessible to a user or user program application;
- database storage managed by a database server (db server);
- a communication system for communicating between the trusted document management server and the database server;
- wherein the tdm server is adapted to handle requests for managing protected documents in the database with unique identifiers and access control information; and
- wherein the db server is adapted to store protected documents, signatures of the documents, unique identifiers and access information, signature of the access information, to permit access of the protected documents under management of the tdm server.

In yet another aspect of the invention, on the request of a user to create and store a protected
- document in the database,
- the tdm server is adapted:
- to generate one or more random identifiers and request that the db server reserve one of the random identifiers as a unique identifier for the document;
- to compute a signature of the document which authenticates a predetermined set of attributes including document content, and the unique identifier for the document;
- to create access control information in the form of an access control list;
- to compute a signature of the access control list which authenticates a predetermined set of attributes including the access control information content, and the unique identifier for the document; and,
- to have the database server store in the database, the document in protected form, its signature, the access control list and the signature of the access control list; and
- wherein the database server is adapted to verify whether the random identifier does not correspond to a unique access number of any other protected document, and if so, to reserve it.

Another aspect of the invention provides a method for secure management of data in a computer controlled storage system including:
- in a trusted data management server (tdm server), responsive to a user or user program application, for storing data in and retrieving data from a storage system generating the following security management structures:
- a unique identifier for the data;
- access control information for the data;
- a data signature for authenticating the data from the data and the unique identifier; and
- an access control information signature for authenticating the access control information from the access control information and the unique identifier.

For added security the tdm server preferably can encrypt the data and the access control information before storing them in the storage.

In yet another aspect of the method of the invention, responsive to a request from a user for accessing secured data from the storage system, the tdm server:
- retrieves a unique identifier for the secured data from the user or database storage;
- retrieves from the storage system the security management structures corresponding to the secured data; and
- carries out the following determination steps:
- determine if the access control information and its unique identifier correspond with the access control information signature;
- determine if the secured data and its unique identifier correspond with the data signature;
- determine if the unique identifier of the access control information corresponds with the secured data; and
- determine whether the access control information permits the user to access the secured data;
- and then grants access to the user to the data if each of the determination steps is satisfied, and otherwise refusing access.

In still another aspect of the invention provides, in a system for secure management of data in a computer controlled storage system:
- a trusted data management server (tdm server) accessible to a user or user program application;
- storage managed by a storage server;
- a communication system for connecting the trusted data management server and the storage server for the transfer of information therebetween;
- using tdm server to manage protected data in the storage means with unique identifiers, data signatures, access control information, and access control information signatures;
- and stores in storage protected data, signatures of the data, unique identifiers, access information, access information signatures, to permit access of the protected data under management of the tdm server.

In still another aspect of the invention provides, in a system for the secure management of documents in a database system:

a trusted document management server (tdm server) accessible to a user or user program application;

database storage managed by a database server (db server); a communication system for communicating between the trusted document management server and the database server;

using the tdm server to handle requests for managing protected documents in the database by using unique identifiers and access control information; and storing in the database storage protected documents, signatures of the documents, unique identifiers and access information, signature of the access information, to permit access of the protected documents under management of the tdm server. On the request of a user to create and store a protected document in the database, the tdm server generates one or more random numbers and request that the db server reserves one of the random numbers as a document access key;

computes a signature of the document which authenticates a predetermined set of attributes including document content, and the document key;

creates access control information in the form of an access control list;

computes a signature of the access control list which authenticates a predetermined set of attributes including the access control information content, and the document key; and, has the database server store in the database, the document in protected form, its signature, the access control list and the signature of the access control list.

The invention also provides software embodiments such as media encoded with program code to effect the above described systems or programs.

DETAILED DESCRIPTION OF THE INVENTION

The present invention satisfies the three numbered requirements listed above for reducing the requirement for trust in a database server, so that protected data stored on a database can be stored without requiring persistent storage on the application server. The invention has a number of features useful in real data processing systems. Protected data (or documents) and access control information (an ACL for instance) are stored separately, but may be managed by the same database storage administrator. A protected document need not be re-signed if the ACL changes, and vice versa; the ACL need not be re-signed if the document changes. In addition the present invention provides data and ACL integrity verification by a relatively inexpensive process.

The problem of reducing trust in a database is summarized in the above three numbered objectives. The first and second objectives, that the database server administrator cannot understand the information it stores, or to modify the access permissions to the document it stores, can be achieved by the use of encryption and digital signatures by the application server, as follows:

The application server signs all data elements with its private key. In this way a rogue database administrator cannot modify the data element. The digital signature may be stored in the database, together with the data.

The application server encrypts each data element, so that the data can only be decrypted with the application server's private key. Cryptographic keys are discussed below.

In a preferred design of the secure document repository, we utilize the both symmetric and public-key asymmetric cryptography technology.

With public key cryptography, an application has two keys, referred to as a key pair. The public key is made available to all users, usually through a directory service, such as X.500 distributed directory. Public key distribution is not discussed in this disclosure. The private key is held locally by the application.

A data element encrypted with the public key may only be decrypted with the corresponding private key. Similarly, a data element encrypted with the private key may only be decrypted with the public key.

With symmetric key technology, a single key is used for both encryption and decryption. One advantage of symmetric key cryptography is that the encryption/decryption, and key generation are much faster than with public-key asymmetric technology.

Note that the plain-text data elements are signed by the application server, not the encrypted data elements. This also means that in order to verify a data element's signature, the data element must first be decrypted.

Private key storage on the application server is not addressed by this invention, as it is addressed by most modern cryptographic systems, which use a variety of techniques including protected files, specialized cryptographic coprocessors, or smart cards.

In a similar fashion, the application server can digitally sign the data element's access control list and store the signature together with the access control list in the application database If the ACL's signature corresponds to the actual ACL, it proves that this ACL was generated by the application server. To prevent the DB administrator from knowing even the contents of an ACL, the Application Server can optionally encrypt the ACL before storing it in the database, and decrypt the ACL after retrieving it from the database.

However, a simple digital signature is not enough to protect the ACL from attacks by the database administrator. For example, the database server could present to the application an ACL (correctly signed by the application server), which corresponds to a different data item. The following tables illustrate such an attack:

| Data element table | |
|---|---|
| data item key | data item content |
| i1 | data item 1 |
| i2 | data item 2 |

| Access Control table | |
|---|---|
| data item key | Access Control Info |
| i1 | ACL1 |
| l2 | ACL2 |

Let's say the application server requests the data item i1, and the corresponding access control information. The database administrator can move ACL2 into the row(s) that should be occupied by ACL1; hence the database server would return the contents i1, and with it ACL2. Thus, the application server is misled into thinking that ACL2 in fact controls access to item i1.

This technique can be used by a user who has access to item i2 (i.e. he is given permission in ACL2), but not to i1. The user could bribe the database administrator, so the two of them perform the above replay attack.

We propose to solve this problem by a special use of unique identifiers and digital signatures.

Each data item is associated with a unique identifier. This can be either the primary key of the database table, or a new field used exclusively to assure data security. The ACL table also contains the unique identifier, so that each individual ACL is associated with the same identifier that the corresponding data element is associated with. The application server can use digital signatures to 'tie' the data item to its access control list.

The data item signature must contain at least the following authenticated attributes:
 data item contents
 data item key The ACL signature must contain at least the following authenticated attributes:
 Serialized ACL
 data item key Thus, the database administrator cannot deceive the application server by moving rows in the database table.

Key Generation

One important aspect of the security of the above scheme is key generation. It is very important that the database server is unable to influence key the next key generated for an item. Otherwise, the system would be vulnerable to following attack:

Let's say a rogue user R wants to gain information to an item that user A will be creating. If user R is in collusion with the database administrator, they could do the following:
 A user tries to create an item
 The application server requests a new key
 Rather than generating a new key, the database assigns the key of an existing item, whose ACL permits access to the item to user R. —The application server sends a request to the database to create a new signed and encrypted item with the assigned key. The request includes the new signed ACL.
 The database administrator replaces the new signed ACL with the signed ACL of the item whose key he assigned to the new item.
 The rogue user R now has access to the newly created item.

To prevent the above attack, it is important that the 'key' which is shared between the item and the ACL is not assigned by the database. Instead, it must be generated by the application server.

Since the application server should not require any local persistent storage, the only way to generate a key is by using a random generator. This way, the key generation would follow this process:
 Application server generates a new random key.
 Application server asks the database to reserve this random key.
 The database server checks that the key is not used, and if so reserves it
 The application server can now create the new item.
 If the key is already used, the application server can try the process again. Note that if the application server should keep track of the number of consecutive duplicate keys—if the number is too large (e.g. 5 or 10), it indicates a potential attempt by the database server to 'wait' for a particular key.

Notice that in this process the random key may not need to be cryptographically random, i.e. an attack is impossible even if the database server is able to predict the value of the next generated key. Given that the key space is large enough, the likelihood of a new random key being the same as that of an item whose ACL the user wants to assign to the new item, is minimal.

Creation and Storage of a Protected Document

Figure 3:
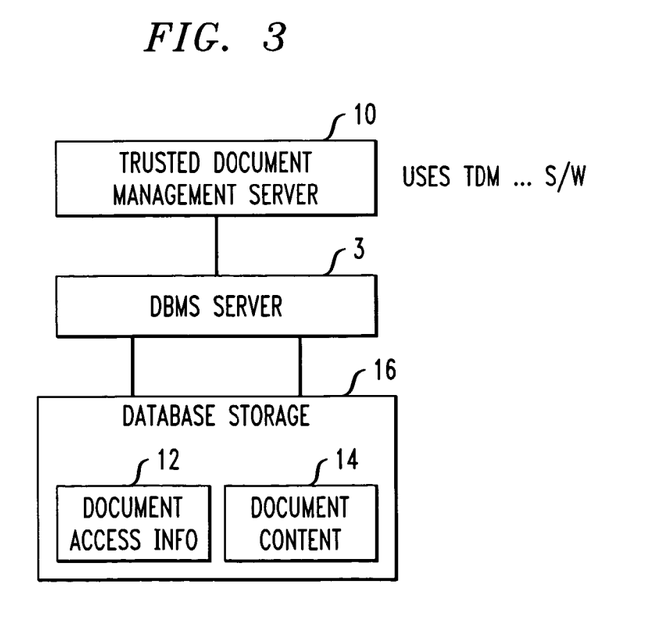
FIG. 3 depicts a protected data management system in accordance with this invention comprising a trusted document management server and a database management system which stores document access information and the document information itself in a protected form.

Referring to FIG. 3, which depicts one embodiment of the invention, an application, in this case trusted document management server 10 is used to store and access protected data through database management server 3 which stores data such as a document in protected form, storing document access information 12, and the contents of the document 14 in database storage 16.

Figure 4:
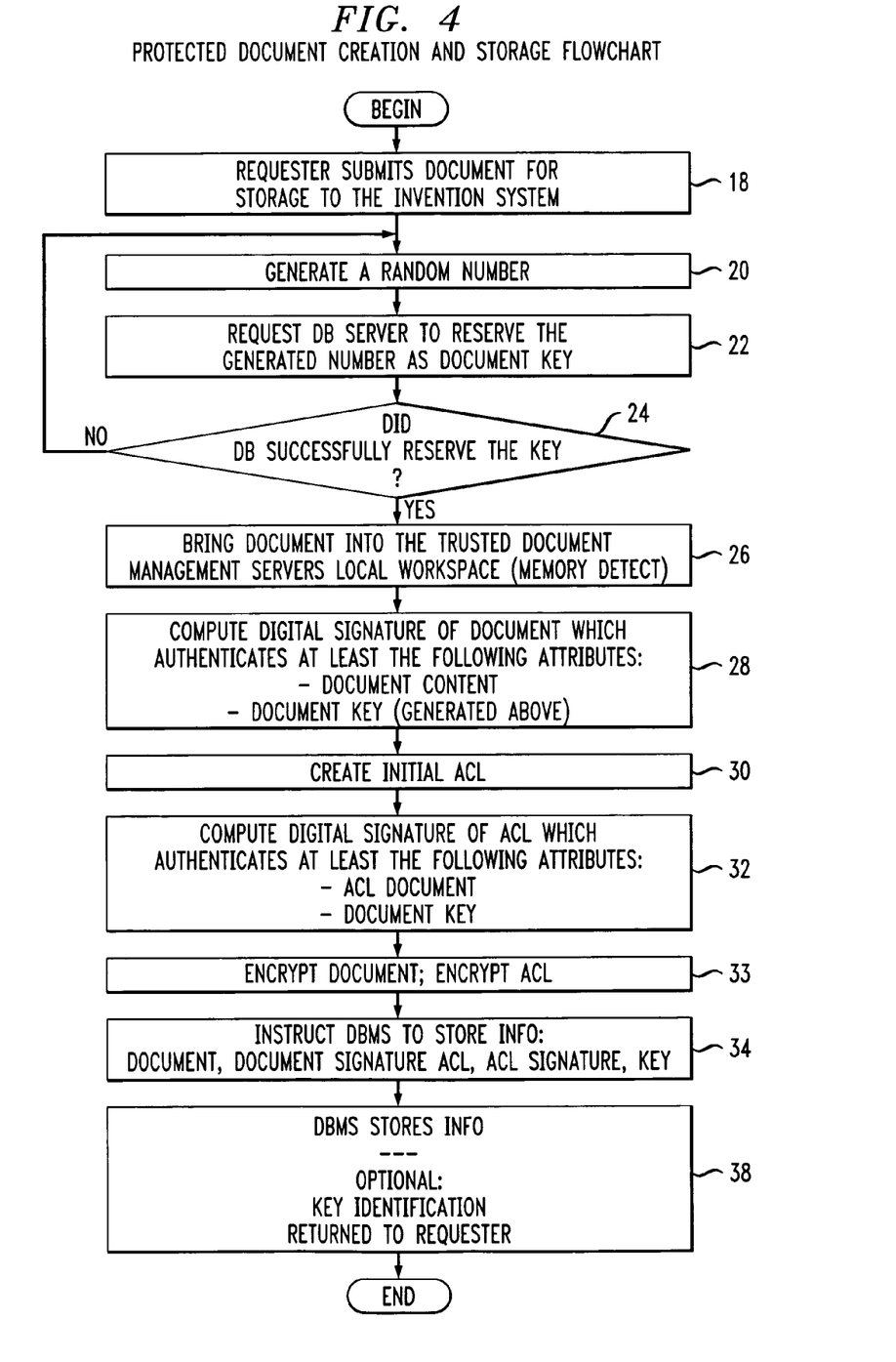
FIG. 4 comprises a flowchart which depicts a process for creating a protected document and storing it in accordance with an aspect of the invention.

Referring to FIG. 4, which depicts the creation and storage of a protected document in accordance with one aspect of the invention, it may be seen that the process begins when a requester submits a document for protected storage under the invention 18, the trusted document management server generates a random number 20, and requests the database server to reserve the generated number as a key (i.e. a unique identifier; any unique identifier can be used as a key) for the document 22. If the database was unable to reserve the number as a key because it was already used for a document, then random number key generation process 20, 22 would be begun again. If the key was successfully reserved then the document is brought 26 into the trusted document management server's 10 local workspace (memory, disk, etc. not shown in FIG. 3). The trusted document management server 10 then computes 28, a digital signature of the document which authenticates at least the following attributes: document content, and document key (generated above), and optionally any other attributes the application requires, e.g. A time stamp. It then creates an initial access control list (ACL) 30. The server then computes a digital signature of the ACL 32, which authenticates at least the following attributes: the ACL content, and the document key and any other attributes, such as a time stamp that the application may require. The server then encrypts 33 the document and the ACL and instructs that database management system to store the document, its digital signature, the ACL, and the ACL's signature in the database 34. The database performs this storage operation 36, and optionally returns the key identification to the requester if required 38. This completes the storage 4 of a protected document in accordance with one aspect of the invention.

It should be noted that an ACL may contain a list of principals and for each principal there is associated a set of permissions to access document. These permissions typically pertain to whether a principal is allowed document access such as retrieve, update, erase, or append privileges.

Updating a Protected Document

Figure 5:
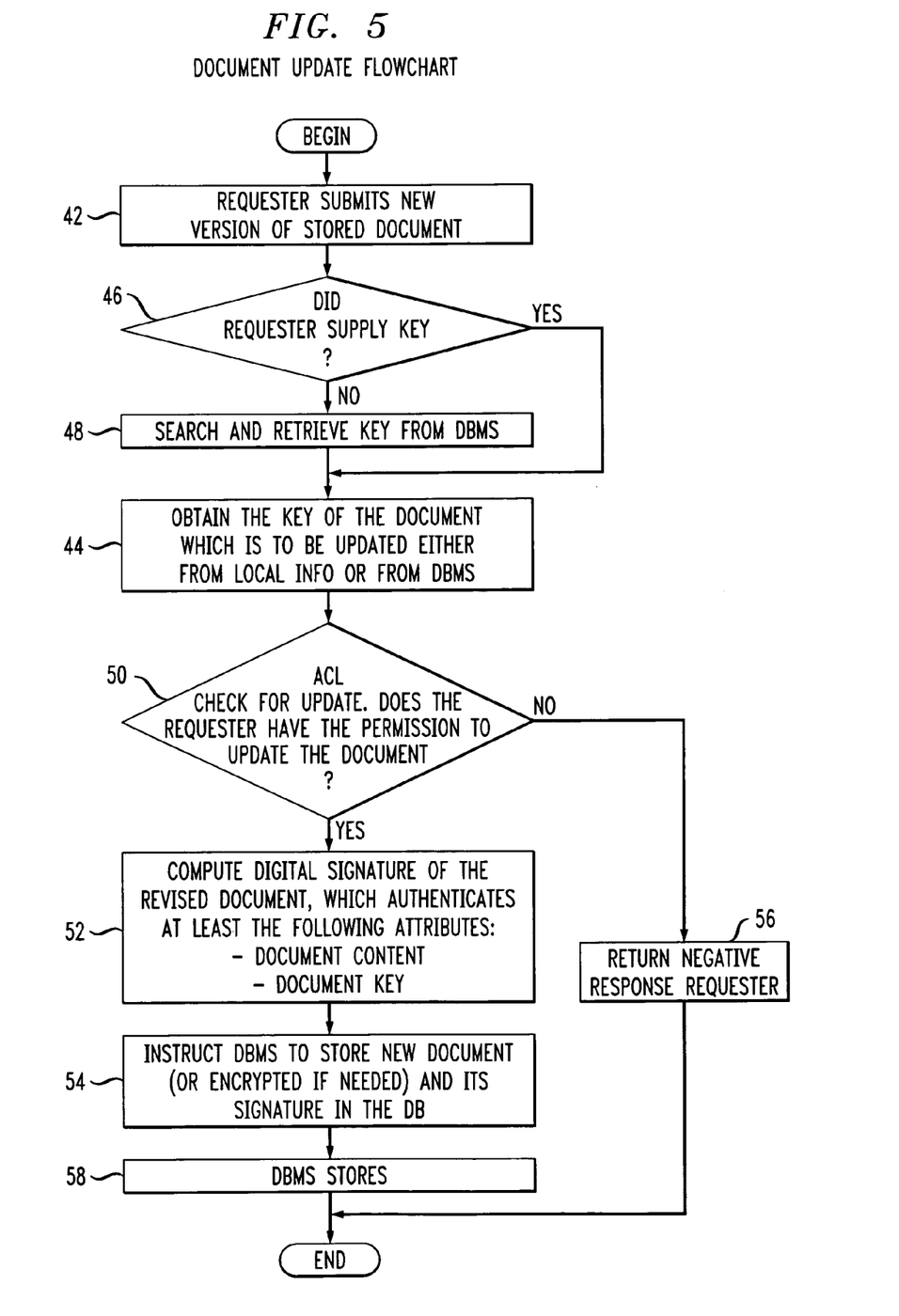
FIG. 5 comprises a flowchart depicting a process of updating a protected document in accordance with an aspect of the invention.

Referring to FIG. 5, the process used by one aspect of the invention to update a document is depicted.

When a requester submits a new version of a previously stored document 42, for instance, to update the stored document, the trusted document management server obtains the key of the document which is to be updated 44, either from local information, such as from the requester 46, or from the database 48. It then perfumes an ACL check process to determine if the requester has the permission to update the document 50 (see FIG. 8 for details). If the requester does not have permission, it optionally can return a negative response to the requester 56. If the requester, on the other hand, does have permission, then the server computes a digital signature of the revised document, which authenticates at least the following attributes: document content, and document key, among others 52. It instructs the database management system to store the new document and its signature in the database 54, which it does 58.

Retrieving a Protected Document

Figure 6A:
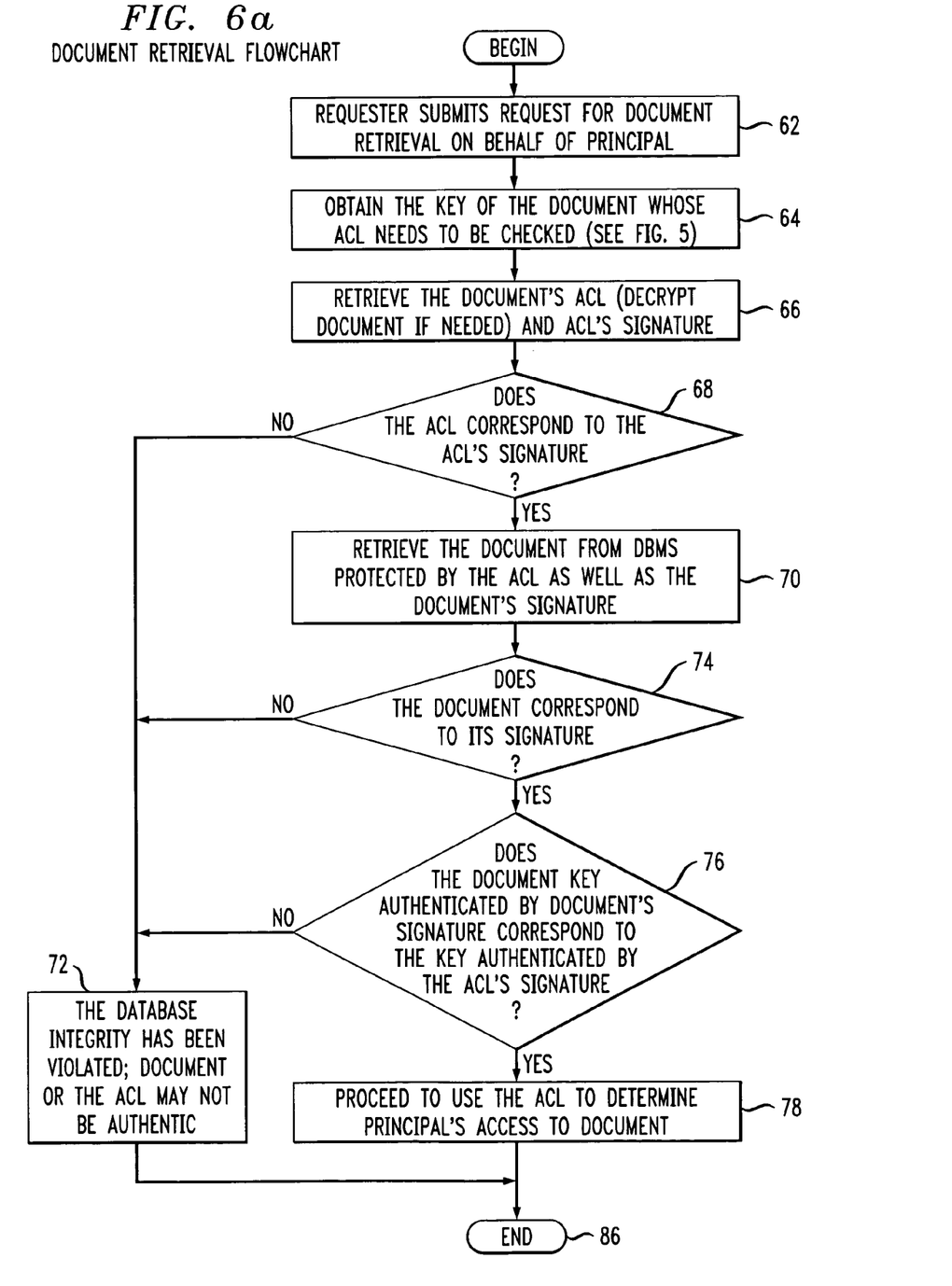
FIG. 6 comprises a flowchart depicting document retrieval in accordance with an aspect of the invention.
Figure 6B:
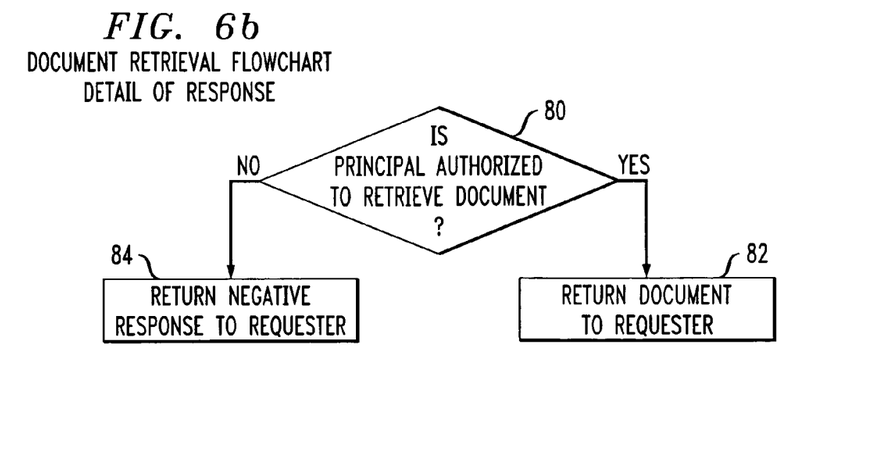

FIG. 6 depicts the retrieval of a protected document from storage in accordance with one aspect of the invention.

For instance, a requester submits a request for retrieval of a document on behalf of a principal 62. The trusted document management server obtains the key 64 of the document, of which the ACL needs to be checked, either from the requester or from the database being accessed. It retrieves the ACL of the document and the signature of the ACL 66. It verifies whether the ACL corresponds to its signature 68. If the ACL does not correspond to the signature, the database integrity has apparently been violated as the ACL or document may not be authentic, retrieval will be rejected 72. If it verifies that the ACL corresponds to the ACL signature it retrieves 70 the protected document as well as the document's signature from the database. It verifies 74 that the document corresponds to its signature. If it does not, then database integrity has been violated, 72. If it authenticates that the document key signed by the document's signature does correspond to the key signed by the ACL signature 76 then it will proceed to use the ACL to determine 78 the principal's access to the document e.g. by determining if the principal is authorized to retrieve the document 80, in which case the document will be returned to the requester 82, or if not then a negative response may be returned to the requester 84.

Updating the ACL

Figure 7:
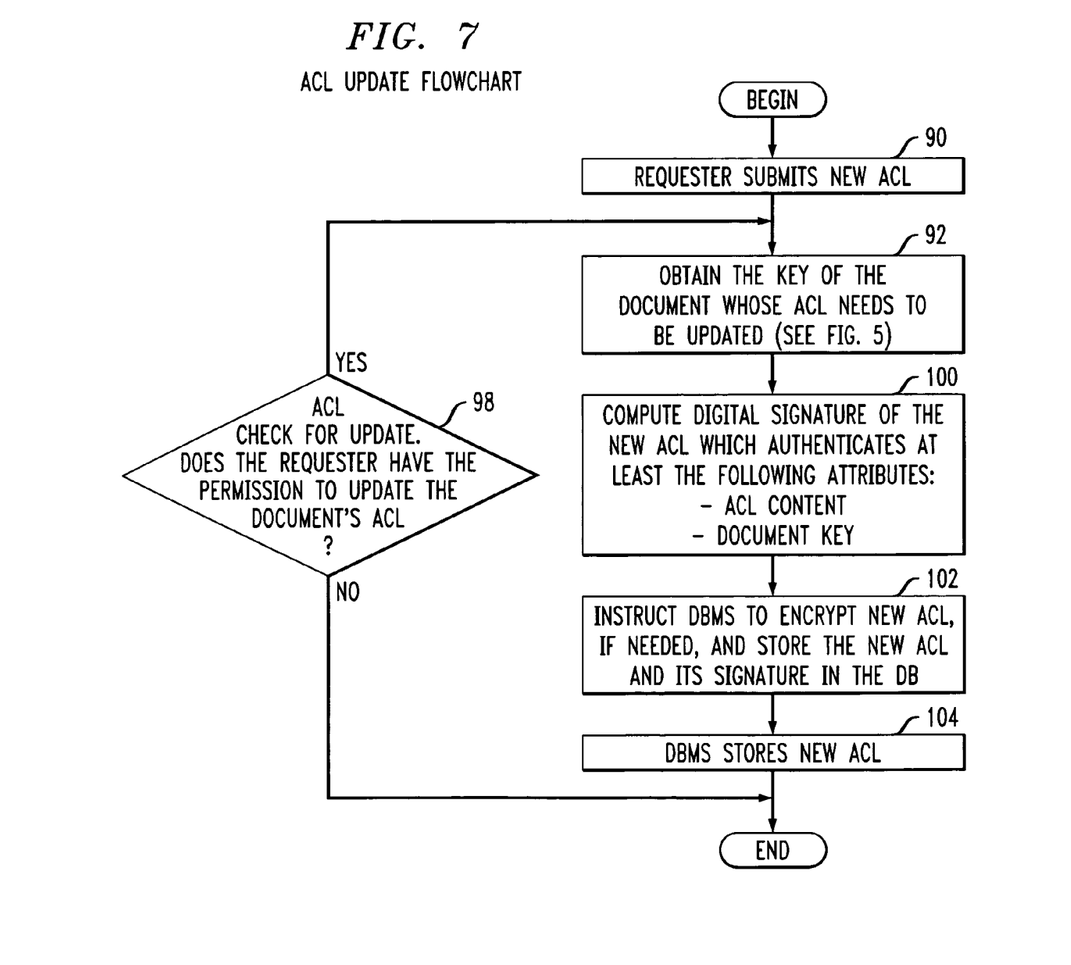
FIG. 7 comprises a flowchart depicting the process for checking an access control list (ACL) in accordance with an aspect of the invention.

Referring to FIG. 7 a process for updating the access control list (ACL) in accordance with one aspect of the invention is shown.

When a requester submits a new ACL to update the currently stored ACL 90, the trusted document server obtains the key of the document for which the ACL needs updating 92, either from the requester 94, or by retrieving it from the database 96. The server performs an ACL check 98 (the details of which may be seen in FIG. 8) to determine whether the requester has permission to update the ACL of the document. If so, the server computes 100 a digital signature of the new ACL, which authenticates at least the following attributes: ACL content, and the document key. The server then instructs the database management system to store the new ACL, and its signature in the database 102, which it does 104.

Checking an ACL

Figure 8:
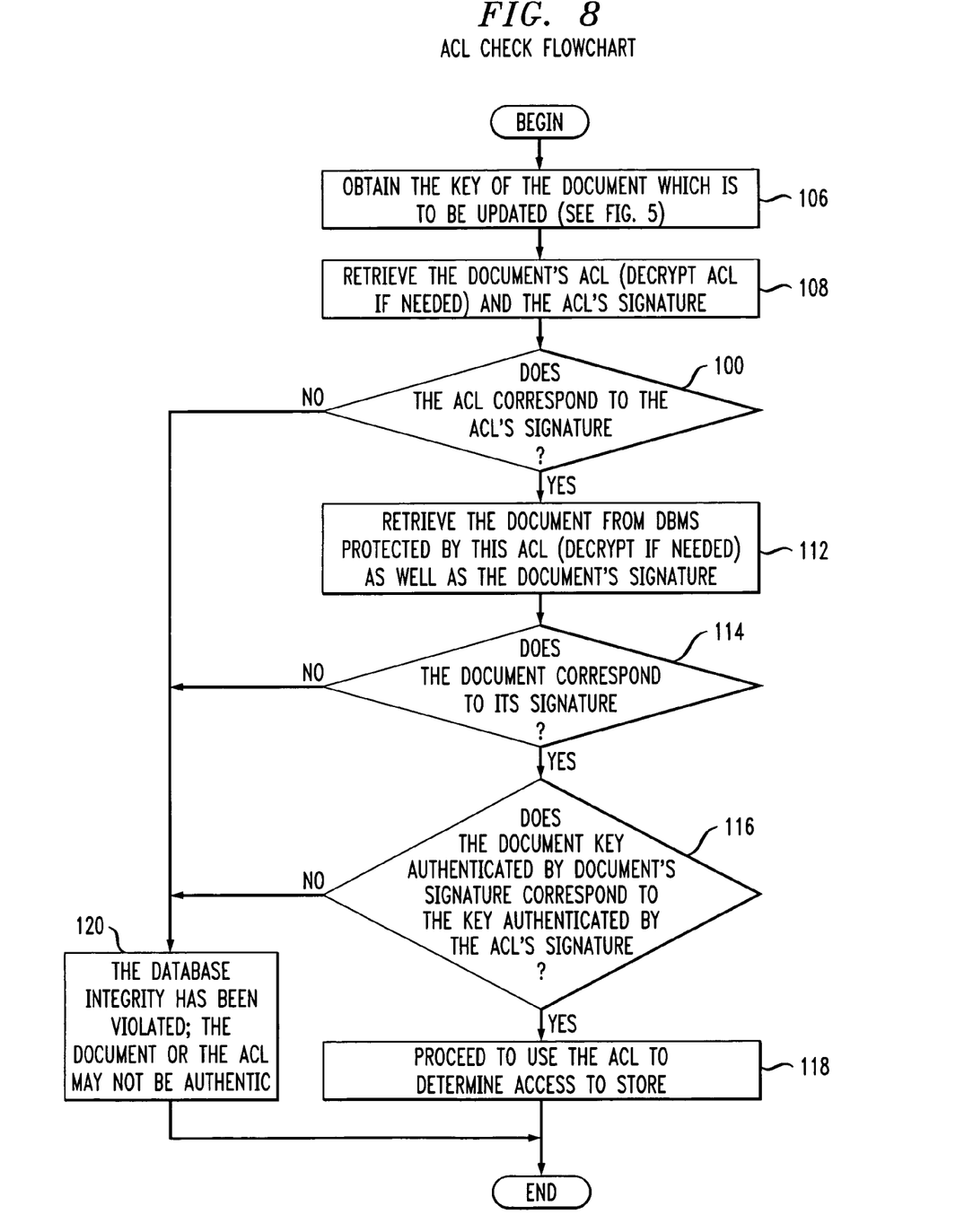
FIG. 8 comprises a flowchart of the checking of an access control list in accordance with an aspect of the invention.

In order to perform the checking of an ACL (such as to determine a principal's access permission for a document one aspect of the invention provides the following method carried out by the trusted document server: the key of the document the ACL of which needs to be checked is obtained 106 either from the requester or from the database. The server retrieves the document's ACL and the signature of the ACL from the database 108. It checks to determine if the ACL corresponds to its signature 110; if not it has determined that the database integrity has been violated, as the document or the ACL may not be authentic 120. If the ACL corresponds to its signature the document protected by the ACL as well as the document's signature are retrieved from the database management system 112. The document is checked to determine if it corresponds to its signature 114. If not there has been an integrity violation of the database. If the document and its signature correspond the server determines if the document key signed by the document's signature corresponds to the key signed by the ACL's signature 116. If so it has authenticated the ACL. The ACL can then be used to determine document access 118 as desired.

The above noted processes of different aspects of the invention are represented by a simplified version of pseudo code which may be translated into a suitable computer control language to carry out the steps indicated. As any programmer skilled in the art of secure database access and management would be knowledgeable in the use of random number generation, keys, digital signatures and authentication procedures these have not been dealt with in detail.

New Document Creation

When the application server is creating a document, it needs to follow the following steps:

Generate a random number

Request the database server to reserve the random number as the new key     Compute a digital signature of the document, that includes as authenticated attributes the document itself, the new key, and any other attributes the application requires (e.g. time stamp).

Create a (default) ACL

Compute a digital signature of the ACL, that includes as authenticated attributes the ACL content, the new key, and any other attributes the application requires (e.g. time stamp).

Store the document, its signature, the ACL, and its signature, in the database server.

Document Retrieval

When the application server is retrieving a document on behalf of a particular user, it needs to follow the following steps:

Retrieve the ACL and it signature, which correspond to the supplied key     Verify the signature of the ACL—this makes sure that the ACL corresponds to the given key     If the signature is correct, check the user permission in the ACL—verify that the requester has as access to the document     If the user has permission, retrieve the document and its signature     If the document is encrypted, decrypt it     Verify the signature of the document—this makes sure that the document corresponds to the given key     If the signature is correct, the document has been successfully retrieved ACL Update When the application server is updating a ACL, it needs to follow the following steps:

Check that the requester has the right to update the ACL for this document     Compute a digital signature of the ACL, that includes as authenticated attributes the ACL content, the document's key, and any other attributes the application requires (e.g. time stamp).

Store the ACL and its signature in the database server.

Document Update

When the application server is updating a document, it needs to follow the following steps:

Check that the requester has the right to update this document Compute a digital signature of the document, that includes as authenticated attributes the document itself, the new key, and any other attributes the application requires (e.g. time stamp).

Store the document and its signature in the database server.

Add-Only Policy

It is important to note that the application server should enforce a policy where access to a document for a particular entity (e.g. user, group, role, etc.) may only be granted, but not removed.

If access to a document were to be removed, the database administrator could perform a replay attack, where he would restore the old ACL and signature, which granted access to the user. Note that the only possible result of this attack would be to re-authorize the entity to a document that it had been authorized to before, but the access was removed. There is still no way for the database administrator to grant access to a entity that had never been listed in this ACL before.

The only way to preserve the trust model for situations where the applications needs to remove a document from the database is to keep some kind of the database or ACL integrity tokens with the application server, which the application server would regularly verify, to ensure that the database had not been tampered with. However, this would ruin our requirement of no persistent storage on the application server.

Similarly, if a document were to be deleted from the database, the database administrator may attempt a replay attack by restoring it, as well as the corresponding signed ACL, from a backup. These situations are treated as being beyond the scope of this invention. We think that nevertheless, this invention is useful for a wide range of real-life applications. This is especially true if, while limited replay attacks were possible when document access is removed, the application server could still discover that such attacks had taken place, by looking in a transaction log.

For this reason, we recommend that an implementation of this system which does not enforce the add-only policy, should have two separate databases, administered by different people: an application database for storing documents, ACLs and signatures; and, a log database, for storing transaction logs.

Some databases provide built-in encryption of data, so that an intruder into the system on which the database resides cannot gain access to the data. The present invention goes beyond that—the database administrator himself cannot gain access to the data.

An alternative way of making sure that the database administrator cannot use a different ACL for the given document would involve including the document's cryptographic digest (e.g. MD5) as an authenticated attribute in the ACL signature.

The problem with this approach is that in order to verify ACL signature the application server would need to retrieve the document first and compute its digest. This is a computationally intensive process for large documents. With our approach the application server need not know the document content in order to verify its ACL, and therefore secure ACL search is much cheaper.

The present invention has the following advantages:

Achieves a higher level of trust in the application, by reducing the trust necessary for the database;

Access control information need not be re-signed if the document has changed;

Document need not be re-signed if the access control information has changed;

Does not require complex tools;

No cryptographic functions on the database server;

Access control information need not be encrypted; hence bulk search can be done by database operations;

No persistent storage required on the application server;

Existing n-tier systems can be migrated to the proposed architecture to increase their trust level.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. Apparatus for secure management of data in a computer controlled storage system comprising:

a trusted data management server (tdm server), responsive to a user or user program application, capable of storing data in and retrieving data from a storage system that comprises:

security structure generator means to generate the following security management structures:

a unique identifier for said data;

access control information for said data;

a data signature for authenticating said data from said data and said unique identifier; and an access control information signature for authenticating said access control information from said access control information and said unique identifier.

2. The apparatus of claim 1 further comprising:
encryption means for encrypting:
said data; and
said access control information, when required by said tdm server.

3. The apparatus of claim 2 wherein said encryption means is adapted to encrypt said data and said access control information.

4. The apparatus of claim 2 further comprising:
storage control means for causing said storage system to store said security management structures and said data.

5. The apparatus of claim 4 wherein said data is stored in encrypted form.

6. The apparatus of claim 5 further comprising:
access control means for accessing said data stored in said storage system with said unique identifier.

7. The apparatus of claim 6 wherein said access control means comprises:
means responsive to a request from a user for accessing secured data from said storage system, adapted to:
retrieve a unique identifier for said data from said user or storage system;
retrieve from said storage system said security management structures corresponding to said data; and
carry out the following determination steps:
determine if said access control information and unique identifier correspond with said access control information signature;
determine if said data and its unique identifier correspond with said data signature;
determine if said unique identifier of said access control information corresponds with said unique identifier of said secured data; and
determine whether said access control information permits said user to access said secured data; and den grant access to said user to said data if each of said determination steps is satisfied, and otherwise refuse access.

8. The apparatus of claim 7 wherein said access control means further includes means to notify said user if access is refused.

9. A method for secure management of data in a computer controlled storage system comprising:
in a trusted data management server (tdm server), responsive to a user or user program application, for storing data in and retrieving data from a storage system generating the following security management structures:
a unique identifier for said data;
access control information for said data;
a data signature for authenticating said data from said data and said unique identifier; and
an access control information signature for authenticating said access control information from said access control information and said unique identifier.

10. The method of claim 9 further comprising:
encrypting said data, or said access control information.

11. The method of claim 10 comprising encrypting said data and said access control information.

12. The method of claim 10 further comprising:
causing said storage system to store said security management structures and said data.

13. The method of claim 12 wherein said data is stored encrypted.

14. The method of claim 13 further comprising:
accessing said data stored in said storage with said unique identifier.

15. The method of claim 13 responsive to a request from a user for accessing data from said storage system, retrieving a unique identifier for said data from said user or database storage;
retrieve from said storage system said security management structures corresponding to said secured data; and
carrying out the following determination steps:
determine if said access control information and its unique identifier correspond with said access control information signature;
determine if said secured data and its unique identifier correspond with said data signature;
determine if said unique identifier of said access control information corresponds with said secured data; and
determine whether said access control information permits said user to access said secured data; and then granting access to said user to said data if each of said determination steps is satisfied, and otherwise refusing access.

16. The method of claim 15 including notifying said user if access is refused.

17. Computer readable storage means for storing instructions for use in the execution in a computer system of the method of claim 10.

18. Computer readable storage means for storing instructions for use in the execution in a computer system for causing the computer system to effect the apparatus of claim 1.

19. An article of manufacture comprising a computer usable medium having computer readable program code means embodied therein for causing secure management of data in a computer controlled storage system, the computer readable program code means in said article of manufacture comprising computer readable program code means for causing a computer to effect the steps of claim 9.

20. A method for storing a document in a secure storage system comprising the steps of:
submitting the document for secure storage;
generating a random number at a trusted document management server;
requesting a database management system to reserve the generated random number as a document key;
computing a digital document signature at the trusted document management server, wherein the document signature is capable of authenticating document content and the document key;
creating an initial access control list (ACL) at the trusted document management server;
computing a digital ACL signature at the trusted document management sever, wherein the ACL signature is capable of authenticating ACL content and the document key; and
instructing the database management system to store the document, the document signature, the ACL and the ACL signature.

* * * * *